United States Patent [19]
Yamada et al.

[11] Patent Number: 5,282,192
[45] Date of Patent: Jan. 25, 1994

[54] OPTICAL DISC APPARATUS USING 4 SEPARATE DETECTION ELEMENTS WITH FIRST AND SECOND MULTIPLYING MEANS

[75] Inventors: Kunio Yamada; Sususmu Takahashi, both of Tokyo, Japan

[73] Assignee: Victor Company of Japan, Ltd., Yokohama, Japan

[21] Appl. No.: 11,424

[22] Filed: Jan. 29, 1993

[30] Foreign Application Priority Data

Jan. 30, 1992 [JP] Japan .................................. 4-040356

[51] Int. Cl.$^5$ .............................................. G11B 7/00
[52] U.S. Cl. ............................ 369/275.4; 369/44.34; 369/44.36; 369/44.41
[58] Field of Search ................... 369/275.4, 120, 44.41, 369/124, 44.42, 44.34, 44.28, 44.36; 360/77.01; 250/201.5

[56] References Cited

U.S. PATENT DOCUMENTS

| 4,589,103 | 5/1986 | Tajima | 369/44.34 |
| 4,787,076 | 11/1988 | Deguchi et al. | 369/44.34 |
| 4,977,551 | 12/1990 | Minami et al. | 369/44.36 |
| 4,998,235 | 3/1991 | Ishibashi et al. | 369/44.36 |
| 5,023,855 | 6/1991 | Kobayashi et al. | 369/44.37 |
| 5,130,963 | 7/1992 | Kusano et al. | 369/44.28 |
| 5,142,520 | 8/1992 | Yanagi et al. | 369/44.34 |
| 5,181,195 | 1/1993 | Kume et al. | 369/44.34 |
| 5,191,571 | 3/1993 | Fukumoto et al. | 369/44.34 |
| 5,199,011 | 3/1993 | McDonald et al. | 369/44.34 |

FOREIGN PATENT DOCUMENTS 56-30610 7/1981 Japan .
3-81207 12/1991 Japan .

Primary Examiner—Carolyn E. Fields
Assistant Examiner—Drew A. Dunn
Attorney, Agent, or Firm—Michael N. Meller

[57] ABSTRACT

An optical disc apparatus for playing an optical disc carrying information in a form of pits laid along a track on the disc, which comprises a light beam for reading the information by forming a beam spot on the disc through an objective lens, a device for displacing the beam spot in a radial direction of the disc, a 4-division optical detector having 4 detecting elements for electro-optically converting a beam of light reflected from the beam spot to electrical signals, a first pair of the 4 detecting elements being arranged correspondingly to one side of the track and a second pair of them being arranged correspondingly to another side of the track, a first multiplier for multiplying respective outputs of the first pair of the 4 detecting elements each other, a second multiplier for multiplying respective outputs of the second pair of the detecting elements each other, and a subtracting device for producing a difference value between respective outputs of the first and second multipliers, and the displacing device displaces the beam spot in response to the difference value to accomplish the tracking control of the beam spot on the series of pits in highly accurate and stable manner.

Accordingly, problems derived from a poor S/N ratio of the generated error signal due to short signal generation periods inherent to conventional optical disc apparatus, have been overcome.

1 Claim, 8 Drawing Sheets

OPTICAL DISC APPARATUS USING 4 SEPARATE DETECTION ELEMENTS WITH FIRST AND SECOND MULTIPLYING MEANS

BACKGROUND OF THE INVENTION

1. Field of the Invention

The present invention relates to an optical disc apparatus such as digital audio disc players, and more particularly to an improved tracking control system for such optical disc apparatus.

2. Description of the Prior Art

Configuration and operation of conventional optical disc apparatuses will be explained with reference to FIG. 1 through 8.

FIG. 1 shows a first example of such a conventional optical disc apparatus. In FIG. 1, numeral 1 is an optical disc, 2 is a light source such as a semiconductor laser device, 3 is a collimating lens for transforming a laser beam projected from the light source 2 into a parallel beam "S", a polarizing beam splitter 4 is provided to separate the parallel beam "S" from a reflected light beam "R" which is reflected back from a surface of the optical disc 1 as a result of the parallel beam "S" impinging the surface of the optical disc 1, 5 is a ¼ λ wave-plate by which a polarization plane of both of the parallel beam "S" and the reflected light beam "R" is rotated 90° as they pass through the wave-plate 5, "P" designates a beam spot formed from the parallel beam "S" by an objective lens 6 confronting the surface of the optical disc 1, 11 is an actuator which displaces the objective lens 6 in a radial direction of the optical disc 1 thereby the beam spot "P" is moved perpendicular (tracking direction) to a tangent of track to perform a radial tracking of the beam spot "P", 15 is a condenser lens to converge and project the reflected light beam "R" directed by the polarizing beam splitter 4, on to a 4-division optical detector 7 which is stationary with respect to a positional fluctuation of the beam spot "P", the 4-division optical detector 7 comprises detecting elements 7a, 7b, 7c and 7d arranged clockwise as shown in FIG. 2A which convert, as received, the reflected light beam "R" into electrical outputs "A", "B", "C" and "D" respectively. Further shown in FIG. 1 includes a first adder 31 which adds respective AC components "b" and "c" of the outputs "B" and "C" of the detecting elements 7b, 7c and produces a resultant output 33, a second adder 32 which adds respective AC components "d" and "a" of the outputs "D" and "A" of the detecting elements 7d, 7a and produces a resultant output 34, a differential amplifier 35 which produces a difference value 37 between the output 33 of the first adder 31 and the output 34 of the second adder 32, a third adder 36 which adds the output 33 and the output 34 and produces a resultant output 38, a multiplier 39 which multiplies the difference value 37 by the output 38 of the third adder 36 and produces a resultant output E2, and an actuator driving circuit 10 which includes a lowpass filter for driving the actuator 11 in response to the output E2 of the multiplier 39.

The optical disc 1 is provided, on a reflective film 12 formed thereon, with a plurality information tracks concentrically or spirally in the form of a series of recessed pits with varying length and separation, and the surface of the reflective film 12 not occupied by the pits is generally called "land".

FIG. 2B shows a part of the information track in positional relationship with the 4-division optical detector 7 including their detecting elements 7a, 7b, 7c and 7d.

In FIG. 2B, a series of pits 13 are aligned along an information track "T" spaced by land portions 14. A surface of the 4-division optical detector 7 is divided by divisional lines 7Y and 7X intersecting each other at a right angle to forming the detecting elements 7a, 7b, 7c and 7d. The 4-division optical detector 7 is placed as such that the divisional line 7Y resides at a center of the reflected light bream from the polarizing beam splitter 4 and a direction of the divisional line 7Y is aligned with a direction "Y" (hereinafter called "track direction") of an image of the information track "T" projected on the 4-division optical detector 7, as a result the divisional line 7X is aligned with a tracking direction "X".

In the conventional optical discs apparatus shown in FIG. 1, an improved push-pull type of tracking control system is employed, and an operation of which will be explained in the following.

In FIG. 1, the linearly polarized parallel beam "S" passed through the polarizing beam splitter 4 is modified to a circularly polarized light beam as it passes through the ¼ λ wave-plate 5, and is focused to form the beam spot "P" on the reflective film 12 of the optical disc 1. Since pits 13 are inscribed on the reflective film 12, when the beam spot "P" is on any of the pits 13, the light beam forming the beam spot "P" is scattered due to diffraction caused by the pit, as a result, an amount of light collected by the objective lens 6 is smaller compared to an amount of light of the beam spot "P" on the reflective film 12. Further, a direction of the circular polarization is maintained upon reflection of the light beam at the reflective film 12, this means that with respect to the beam advancing direction, the direction of the circular polarization is reversed in the reflected light beam. The light beam thus having the reversed polarization is converted to a linearly polarized light beam as it passes through the ¼ λ wave-plate 5, then reflected by the polarizing beam splitter 4, in turn converged on the 4-division optical detector 7 by the condenser lens 15.

In such a conventional optical disc apparatus, detection of offset of the beam spot from the track i.e. the detection of an offset amount between respective centers of the beam spot "P" and the information track "T" in the case of FIGS. 1 and 2 (the amount of this offset is hereinafter called "tracking error"), is performed based on a difference value outputted from at least a pair of detection elements disposed symmetrically with respect to a divisional line of optical detector aligned with a track center line. This is derived from a fact that when the center of the beam spot "P" is right on the center of the track (track center) i.e. the center line of the series of pits 13, a symmetrical distribution of reflected diffraction light with respect to the divisional line aligned with the track direction, is obtained, otherwise such light distribution becomes asymmetrical.

As mentioned before, when the center of the beam spot "P" is off the track center of the track "T", the center line of the track image projected on the 4-division optical detector 7 is shifted to a side of the divisional line 7Y causing a difference in an amount of irradiating light between the detecting elements 7a and 7b or between 7c and 7d where the difference of light amount corresponds to the distance of the shift of the center of the beam spot "P" from the track center. Further, between the two(2) detecting elements 7a and 7d or 7b and 7c shifted to a side of the projected imaginary track center, a received amount of light varies similarly each other with a slight time delay between the two as the disc 1 revolves.

In FIG. 1, the AC components "b" and "c" of the outputs "B" and "C" which respectively corresponds to the received light amounts by detecting elements 7b, 7c, are added each other and amplified by the first adder 31, similarly, the AC components "d" and "a" of the outputs "D" and "A" which respectively corresponds to the received light amounts by detecting elements 7d, 7a, are added each other and amplified by the second adder 32. A difference component between the outputs 33 and 34 is produced and amplified by the differential amplifier 35, the output 37 of which is applied to an input of the multiplier 39, also the outputs 33 and 34 are added each other and amplified by the third adder 36, and the output 38 of which is applied to another input of the multiplier 39. From the multiplier 39, a tracking error signal is produced as the output E2 and is fed to the actuator driving circuit 10 in which high frequency components in the tracking error signal is removed by the low-pass filter (not shown) to drive the actuator 11 so that the center of the beam spot "P" is controlled to be located always on the track center.

In such a prior art optical disc apparatus, there is a problem in practical operation of the apparatus that the parallel beam "S" is not always absolutely perpendicular to the surface of the reflective film 12 as the optical disc 1 inevitably has a warp or a surface-runout which make the disc surface off-perpendicular with respect to a direction of the impinging parallel beam "S", this causes the produced tracking error signal to include a phantom components thus reduces tracking precision and stability of the prior art optical disc apparatus, or in other words, the problem makes a tolerance of the inclination of the disc surface smaller. The arrangement of the first example of conventional optical disc apparatus shown in FIG. 1, is an example of efforts to minimize such a problem.

Shown in FIG. 3 are experiment data measured on the conventional optical disc apparatus of FIG. 1, in which waveforms of respective outputs from the detecting elements 7a, 7b, 7c and 7d are taken under the condition that the center of the tracking controlled beam spot "P" is approximately positioned on the track center. The signals (waveforms) "a", "b", "c" and "d" are DC removed components of the electrical outputs "A", "B", "C" and "D" of the 4-division optical detector 7, and the respective horizontal lines indicate zero levels. Tracking error signal E2 indicated in FIG. 3 is a value calculated from the experiment data of above "a", "b", "c" and "d". As can be seen from FIG. 3, the tracking error signal E2 is produced at a part where pits reside which enables the detection of tracking error, on the other hand, no tracking error signal E2 is produced at a part of land where the detection of tracking error is not possible and is subjected largely by a tilt of the optical disc 1. As a result, the tracking error signal E2 is peaked at around a center of each pit and is substantially reduced at around each boundary between a pit and a land.

Next, a second example of conventional optical disc apparatus will be explained with reference to FIG. 4, which is featured in its tracking system that the tracking error is adequately detected at a boundary between a pit and a land and is invulnerable to the surface-runout of disc, thus the apparatus is said to be suitable to high density recording mediums. The constituent elements same as ones in FIG. 1 are given the same designations and numerals and detailed explanation of such are omitted.

In FIG. 4, "B", "C", "D" and "A" are output signals from the detecting elements 7b, 7c, 7d and 7a of the 4-division optical detector 7, and AC components (not shown) of which are identical to the previously explained "b", "c", "d" and "a". An adder 41 adds the AC components "c" and "a" of the outputs "C" and "A" and an output of the adder 41 is supplied to one of the terminals of a differential amplifier 45, likewise, an adder 42 adds the AC components "b" and "d" of the outputs "B" and "D" and an output of the adder 42 is supplied to another terminal of the differential amplifier 45, an adder 43 adds the AC components "b" and "a" of the outputs "B" and "A" and an output of the adder 43 is supplied to one of the terminals of a differential amplifier 46, likewise, an adder 44 adds the AC components "c" and "d" of the outputs "C" and "D" and an output of the adder 44 is supplied to another terminal of the differential amplifier 46. Respective outputs of the differential amplifiers 45 and 46 are supplied to and multiplied each other by a multiplier 20, a tracking error signal is produced as an output E3 from the multiplier 20 and is fed to the actuator driving circuit 10 in which high frequency components in the tracking error signal E3 is removed by the low-pass filter (not shown) to drive the actuator 11.

Experiment data measured on the second example of the conventional optical disc apparatus of FIG. 4 is shown in FIG. 5, in which the signals (waveforms) "a", "b", "c" and "d" are actually measured values with the tracking control being applied and are identical respectively to those shown in FIG. 3, i.e. DC removed components of the electrical outputs "A", "B", "C" and "D" of the 4-division optical detector 7, and the respective horizontal lines indicate zero levels. Tracking error signal E3 is a value calculated from the aforementioned actual measured values "a", "b", "c" and "d". In FIG. 5, a small amount of the tracking error signal E3 is present at land portions where no tracking error information is present in principle, the amount shown is considered to be measurement errors, and it should be noted that at the land portions, the tracking error signal output is subjected largely by a tilt of the optical disc 1. On the other hand, the tracking error signal E3 is well produced at boundary portions between a pit and a land but is substantially suppressed at around centers of respective pit portions where tracking error information are present. As a result, duration in which the tracking error signal E3 is produced is relatively short in this system thus it makes the tracking error signal E3 poor in S/N ratio.

SUMMARY OF THE INVENTION

Accordingly, it is a general object of the present invention to provide an improved optical disc apparatus having a tracking control system of higher accuracy and stability, in which aforementioned problems of inaccurate and unstable tracking control because of poor S/N ratio of the error signal due to short signal generation periods, have been overcome.

Another and specific object of the present invention is to provide an optical disc apparatus for playing an optical disc carrying information in a form of series of pits laid along a track on a surface of the optical disc, the apparatus comprises a source of light beam for reading the information by forming a beam spot on the surface of the disc through an objective lens, a displacing device for displacing the beam spot in a radial direction of the disc, a 4-division optical detector having 4 separate detecting elements for electro-optically converting a beam of light reflected from the beam spot to electrical signals, a first pair of the 4 separate detecting elements being arranged correspondingly to one side of the track and a second pair of the 4 separate detecting elements being arranged correspondingly to another side of the track, a first multiplying device for multiplying respective outputs of the first pair of the 4 separate detecting elements each other, a second multiplying device for multiplying respective outputs of the second pair of the 4 separate detecting elements each other, and a subtracting device for producing a difference value between respective outputs of the first and second multiplying devices, so that the displacing device displaces the beam spot in response to the difference value to accomplish the tracking control of the beam spot on the series of pits in highly accurate and stable manner.

Other objects and further features of the present invention will be apparent from the following detailed description with respect to a preferred embodiment of the invention when read in conjunction with the accompanying drawings.

DETAILED DESCRIPTION OF THE PREFERRED EMBODIMENT

Figure 1:
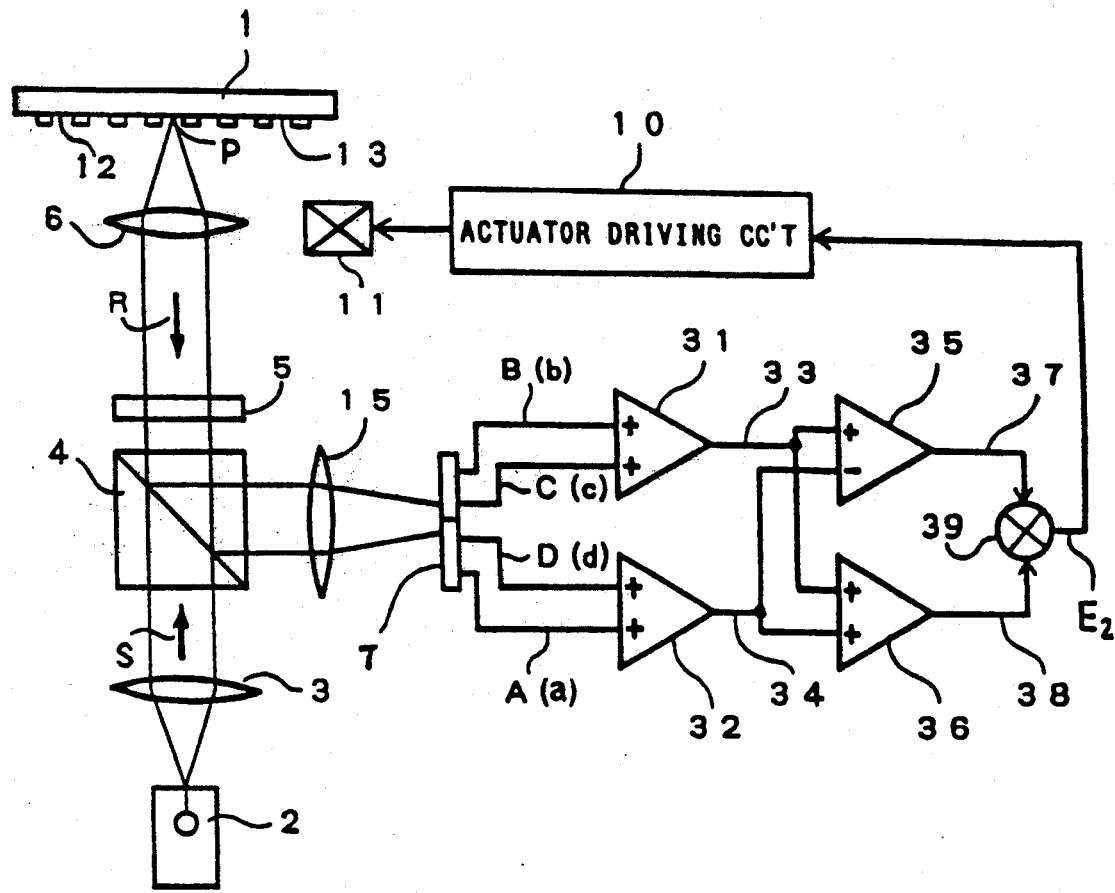
FIG. 1 shows a first example of conventional optical disc apparatus.

Optical disc apparatus according to the present invention will be described in detail with reference to the accompanying drawings, in which same reference numerals and symbols are used to denote like or equivalent elements used in the aforementioned prior arts, and detailed explanation of such elements are omitted for simplicity.

Figure 2:
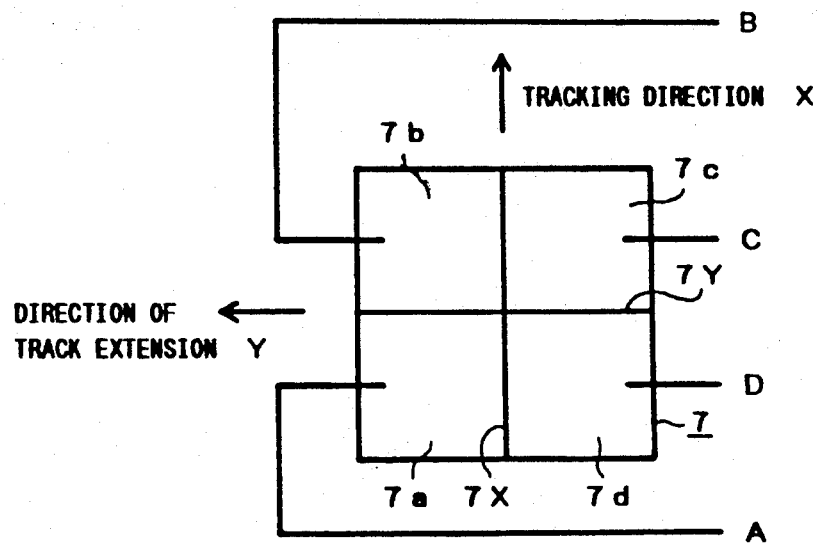
FIG. 2A shows a detail of 4-division optical detector used in conventional optical disc apparatuses and in the present invention for tracking control.
FIG. 2B shows a part of information track in positional relation with the 4-division optical detector shown in FIG. 2A.
Figure 2:
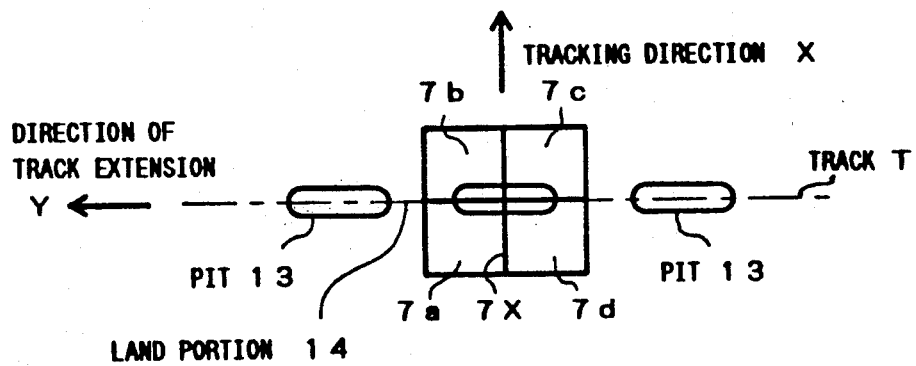
Figure 6:
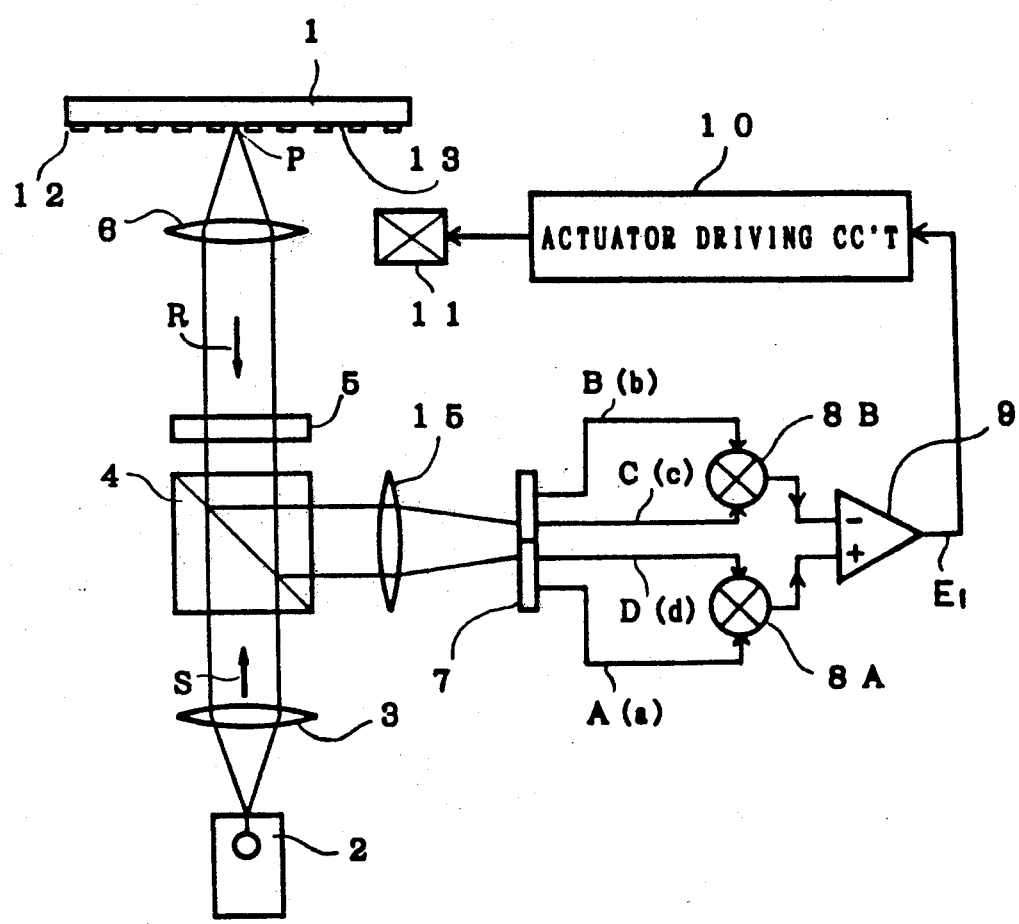
FIG. 6 shows an optical disc apparatus according to an embodiment of the present invention.

FIG. 6 shows an embodiment of the present invention, and the 4-division optical detector 7 shown in FIG. 2A is also used in this embodiment in positional relation with the track "T" as shown in FIG. 2B, a surface of the 4-division optical detector 7 is divided crisscross by divisional lines 7Y and 7X to form detecting elements 7a, 7b, 7c and 7d as shown in FIG. 2A, of which the detecting elements 7b and 7c are aligned in-line and arranged approximately parallel to the track "T" at one side thereof as shown in FIG. 2B, on the other hand, the detecting elements 7d and 7a are aligned in-line and arranged approximately parallel to the track "T" at another side thereof, this means that the detecting elements 7a and 7b are aligned in-line in the tracking direction and the same is true to the detecting elements 7c and 7d.

In this embodiment of the present invention, it is intended to generate a tracking error signal at a center portion and at edges of a pit. In order to realize it, AC components of outputs from the detecting elements 7a and 7d which are located one side of the divisional line 7Y are multiplied each other and AC components of outputs from the detecting elements 7b and 7c which are located another side of the divisional line 7Y are multiplied each other, then a resultant products are subtracted each other to form a tracking error signal by which the actuator 11 is controlled through the driving circuit 10, so that more accurate and stable tracking control operation which is less susceptible to an inclination of a disc surface of the optical disc 1 due to a warp and/or a surface-runout thereof, is performed in the optical disc apparatus of the present invention.

In FIG. 6, the AC components "d" and "a" of the outputs D and A from the detecting elements 7d and 7a are supplied to a multiplier 8A to be multiplied each other, likewise, the AC components "b" and "c" are multiplied each other by a multiplier 8B, in turn, respective outputs of the multipliers 8A and 8B are supplied to a differential amplifier 9 from which a difference value is outputted as a tracking error signal E1 which is fed to the actuator driving circuit 10. In the actuator driving circuit 10, high frequency components included in the tracking error signal E1 are removed by a lowpass filter (not shown) built in the actuator driving circuit 10, and a resultant control signal is supplied to the actuator 11 so as to control the center of the beam spot "P" being positioned to the center of the track "T".

The tracking error signal E1 shown in FIG. 6 includes a signal component obtained when the beam spot "P" is on the pit 13 and another signal component obtained when the beam spot "P" is on the land portion. When the beam spot "P" scans the track "T" as the optical disc 1 revolves, the tracking error signal component detected when the beam spot "P" is on a head or tail end of the pit 13 with respect to the track direction "Y", is defined to be "J" component, and the tracking error signal component detected when the beam spot "P" is on the center of the pit 13 with respect to the track direction "Y", is defined to be "Et" component, and the tracking error signal component detected when the beam spot "P" is on the land portion is defined to be "G" component. Obviously the "G" component does not contain a true tracking error information but contains a phantom signal caused by the inclination of the optical disc 1 as explained before. Accordingly, it is desirable to minimize the "G" component to be outputted as the tracking error signal E1.

Figure 3:
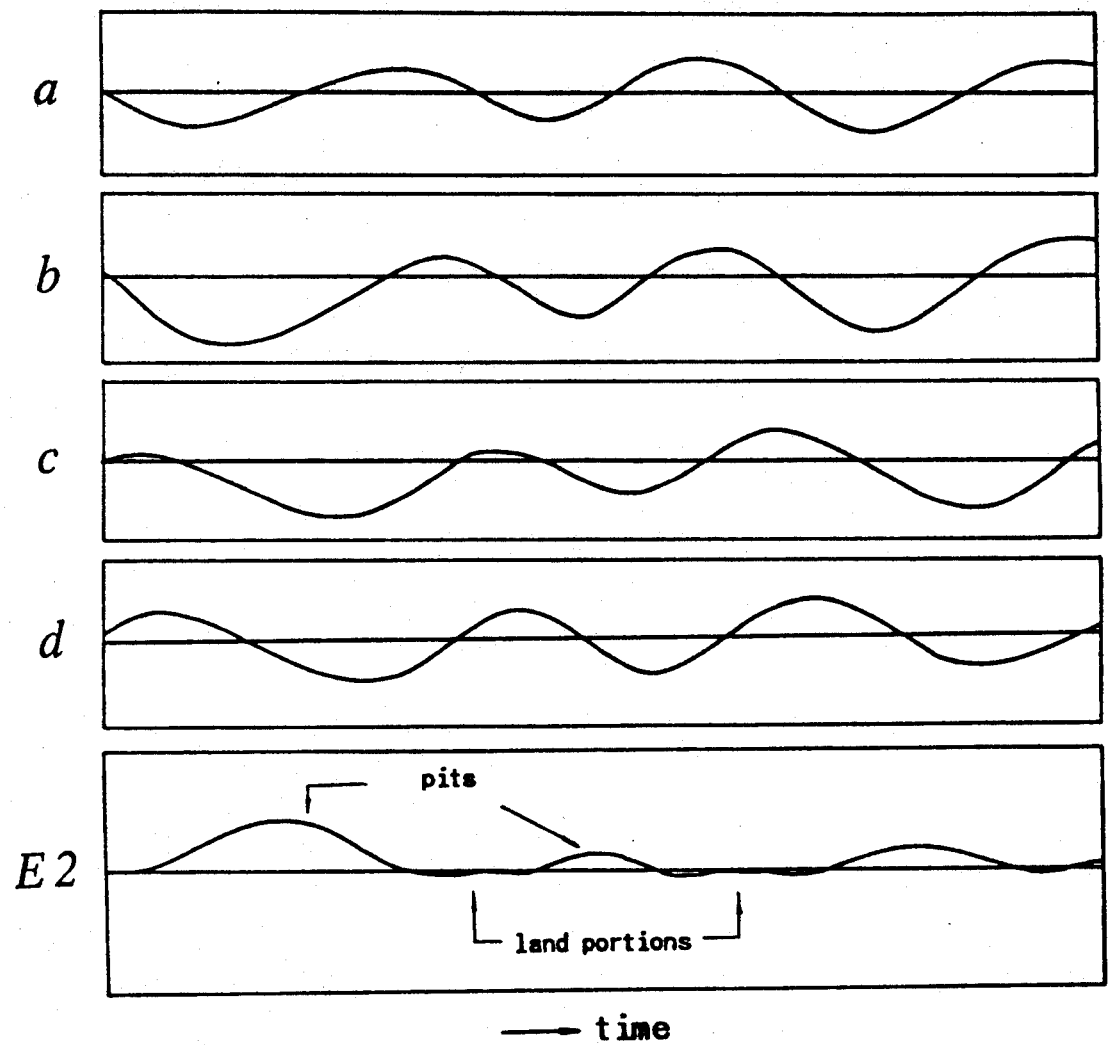
FIG. 3 shows output signals of the 4-division optical detector and an produced tracking error signal in the first example of conventional optical disc apparatus shown in FIG. 1.
Figure 7:
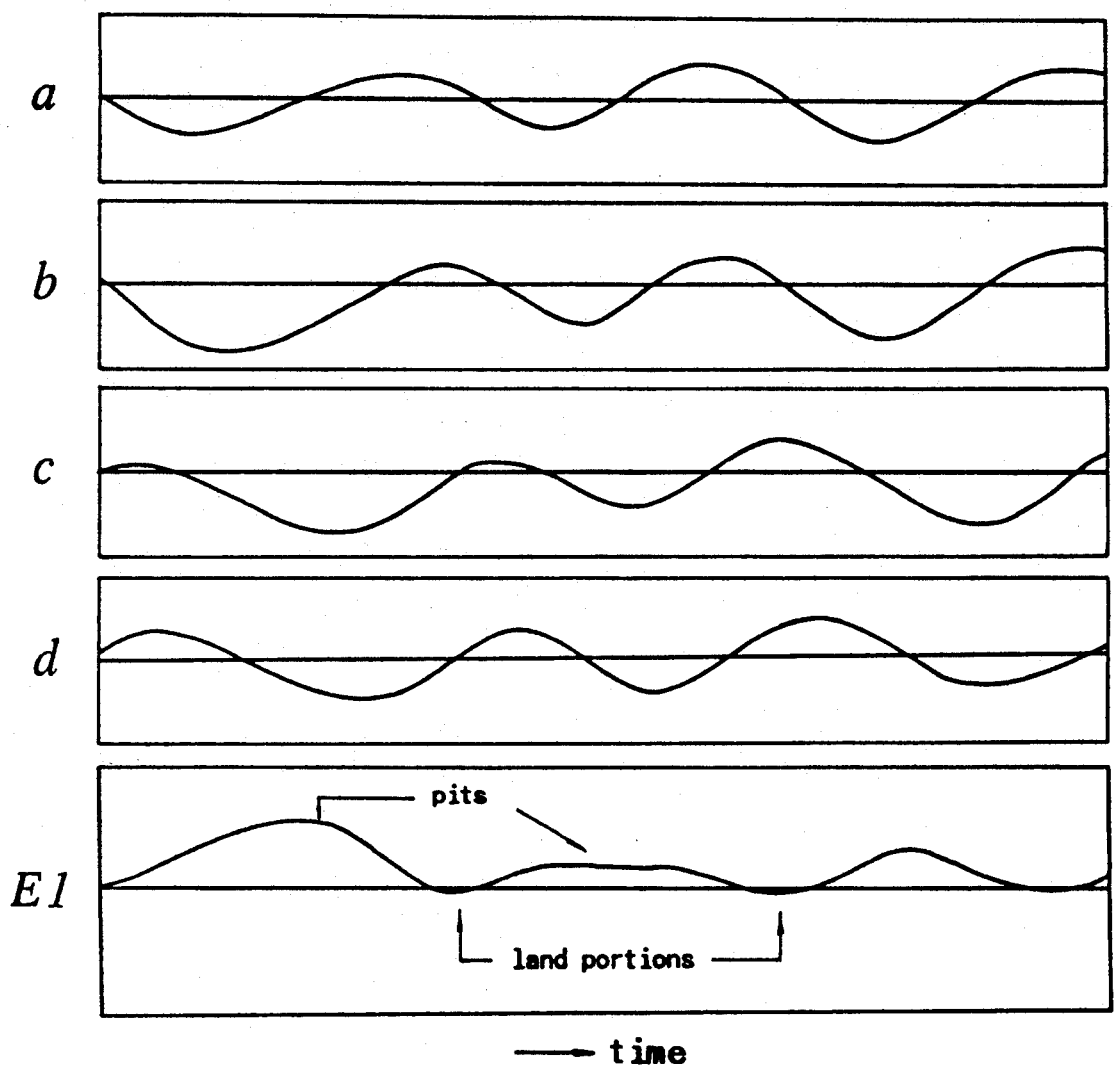
FIG. 7 shows output signals of the 4-division optical detector and an produced tracking error signal in the optical disc apparatus according to the embodiment of the present invention shown in FIG. 6.

FIG. 7 shows measurement data taken on the embodiment shown in FIG. 6 with the tracking control being operated, in which AC components "a", "b", "c" and "d" are respectively identical to those shown in FIG. 3, and horizontal straight lines indicate a zero level as in FIG. 3. Tracking error signal E1 is derived from the AC components "a", "b", "c" and "d" by calculation.

Figure 5:
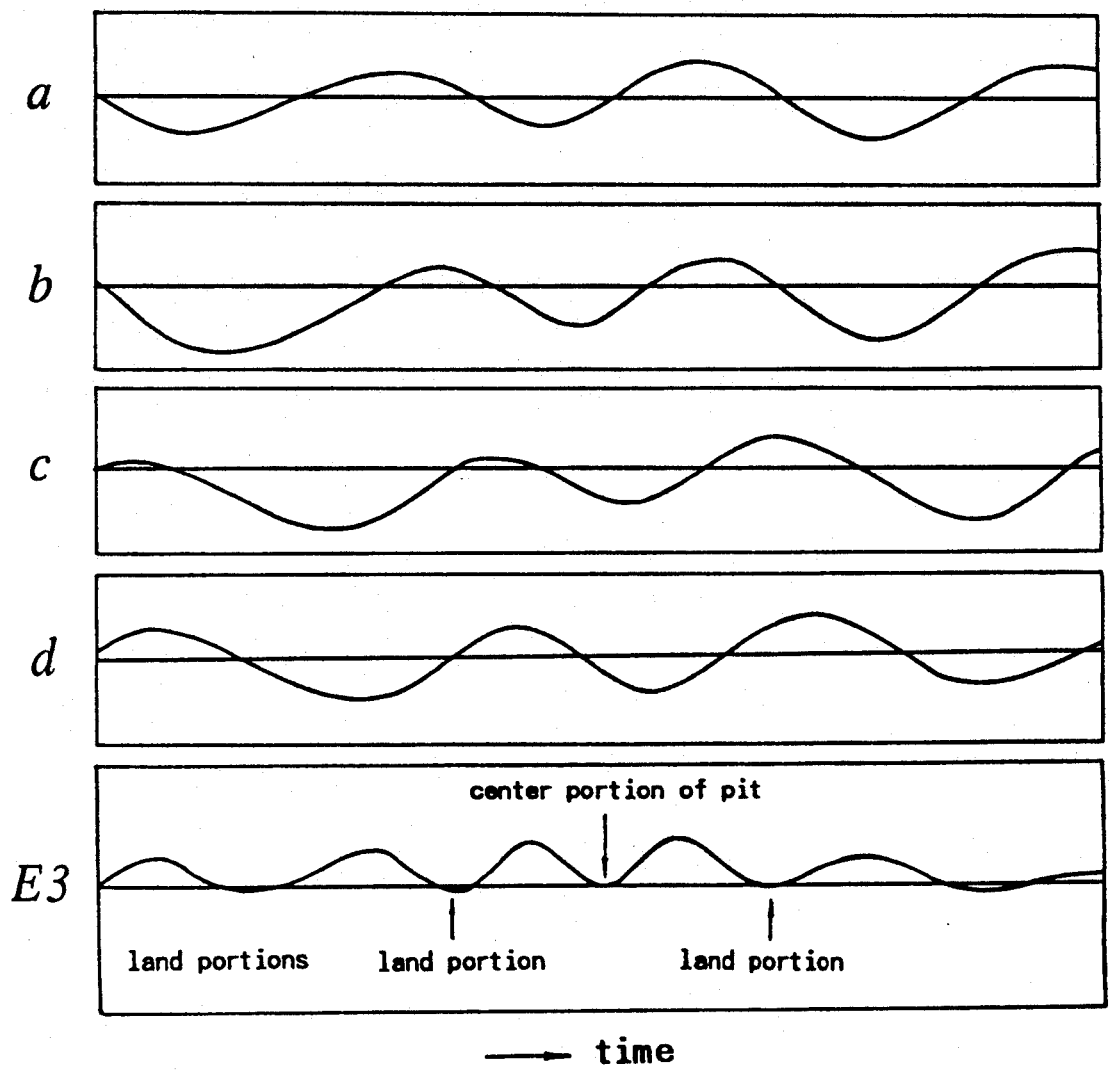
FIG. 5 shows output signals of the 4-division optical detector and an produced tracking error signal in the second example of conventional optical disc apparatus shown in FIG. 4.

As can be seen from FIG. 7, the aforementioned "G" component is not generated as the tracking error signal E1 at the land portions, whereas both the "J" (tracking error signal generated at boundaries between a pit and a land) and "Et" (tracking error signal generated at the centers of pits) components are adequately generated at pit portions. Further, the tracking error signal E1 is present relatively longer time in overall compared to that in the prior arts shown in FIGS. 3 and 5 and there presents no dip at the centers of the pit portions.

Figure 4:
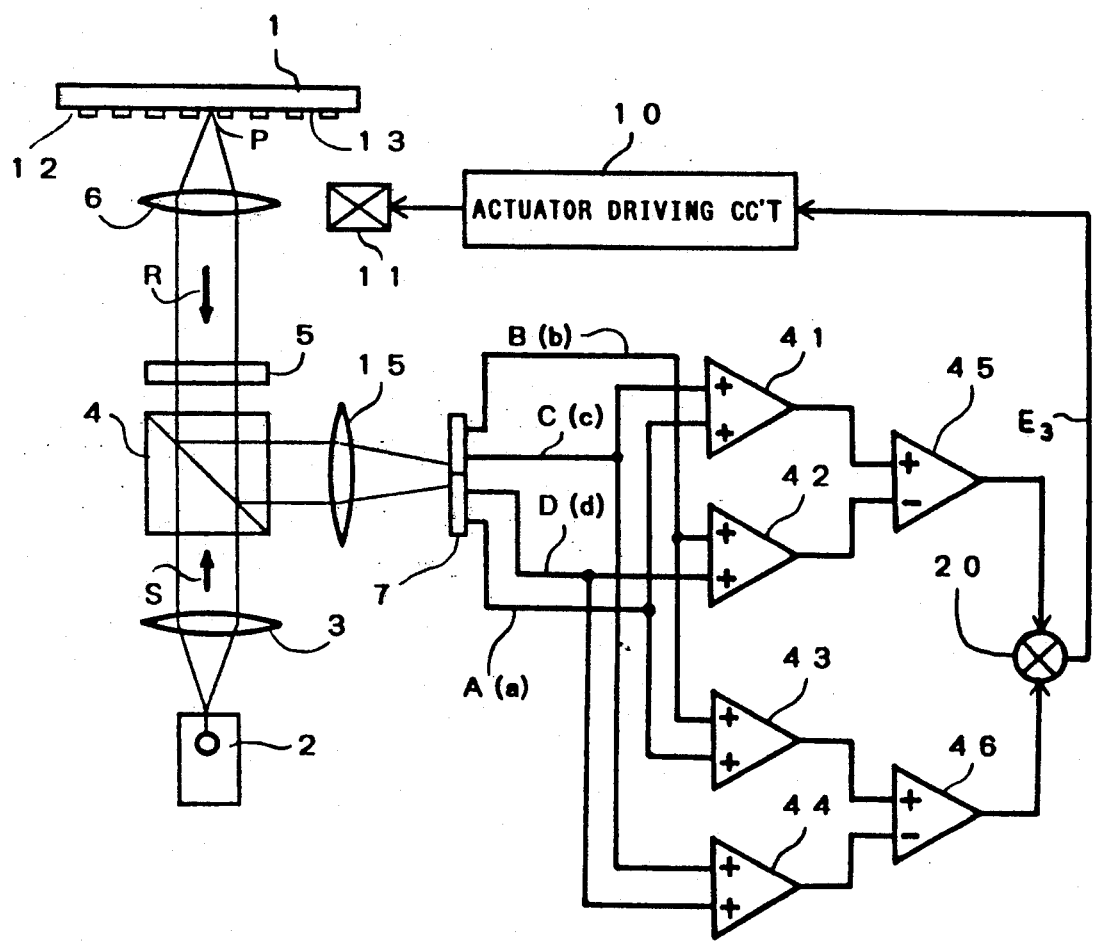
FIG. 4 shows a second example of conventional optical disc apparatus.
Figure 8:
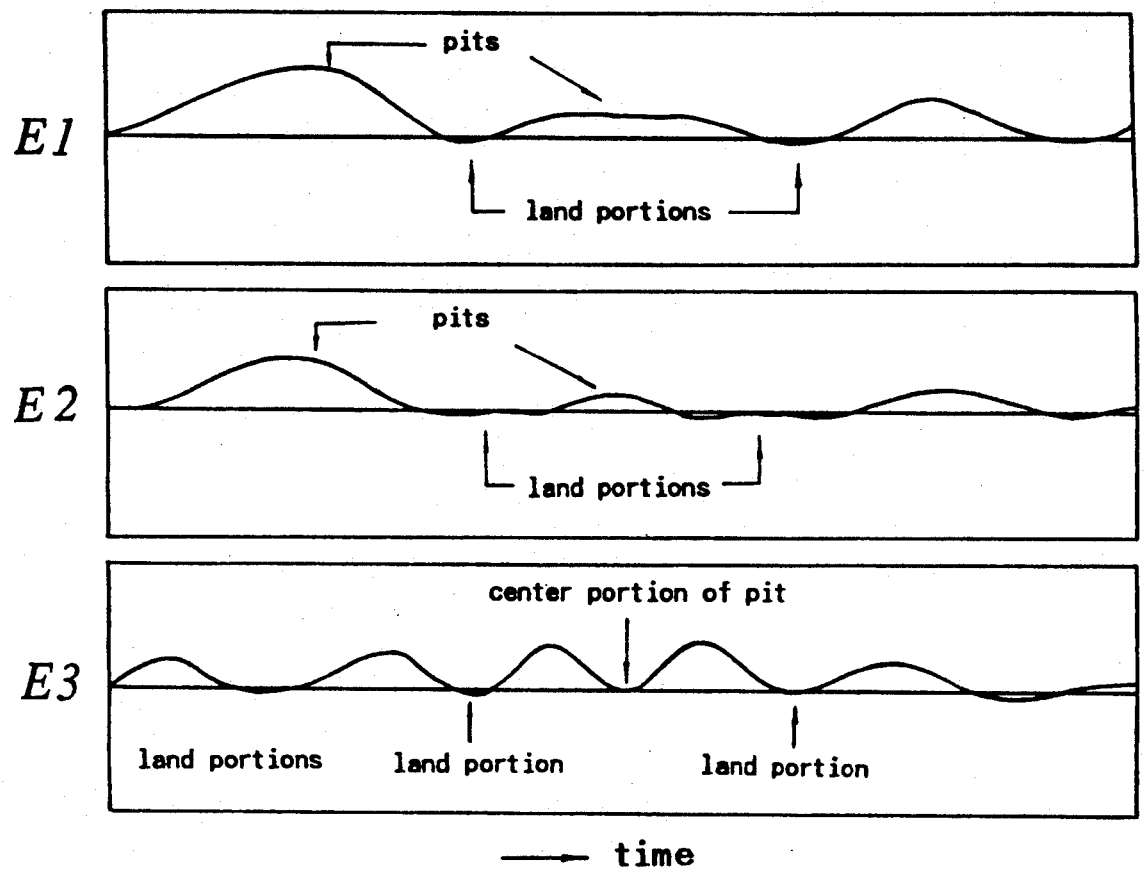
FIG. 8 indicates a comparison of tracking error signals of the prior arts shown in FIGS. 1 and 4 and of the embodiment of the present invention shown in FIG. 6.

FIG. 8 indicates comparison of generated tracking error signals of the 2 prior arts and the present invention, i.e. E1 is the signal of the present invention shown in FIG. 6, E2 of the prior art of FIG. 1, E3 of FIG. 4 and the time axis (horizontal coordinate) is common to E1 through E3.

As explained in the foregoing, a highly accurate and stable tracking control is performed in the optical disc apparatus of the present invention thanks to the tracking error signal which presents (being detected) comparably longer time period thus having a higher S/N ratio during the operation of the apparatus.

Following are experimental results obtained on the optical disc apparatuses of the embodiment of present invention and of the 2 prior arts playing discs of different

| (1) | Track Pitch: 0.7 $\mu$m; Eccentricity: 200 $\mu$m |
| --- | --- |
|     | Apparatus of present invention: tracking possible |
|     | Apparatus of first prior art: tracking not possible |
|     | Apparatus of second prior art: tracking not possible |
| (2) | Track Pitch: 0.7 $\mu$m; Eccentricity: 150 $\mu$m |
|     | Apparatus of present invention: tracking possible |
|     | Apparatus of first prior art: tracking not possible |
|     | Apparatus of second prior art: tracking not possible |
| (3) | Track Pitch: 0.6 $\mu$m; Eccentricity: 10 $\mu$m |
|     | Apparatus of present inventon: tracking possible |
|     | Apparatus of first prior art: tracking unstable |
|     | Apparatus of second prior art: tracking unstable |

From the fact that the track pitch of commercially available audio compact discs today is around 1.6 $\mu$m, it is certain that tracking can be performed quite normally under such conditions that the track pitch is substantially reduced from 1.6 $\mu$m with considerable amount of eccentricity with the optical disc.

Accordingly, the present invention is quite effective to make optical disc apparatuses with improved tracking accuracy and stability.

What is claimed is:

1. Optical disc apparatus for playing an optical disc carrying information in a form of series of pits laid along a track on a surface of said optical disc, comprising:

a source of a light beam for reading said information by forming a beam spot of said light beam on said surface through an objective lens;

means for displacing said beam spot in a radial direction of said optical disc;

a 4-division optical detector for electro-optically converting a beam of light reflected from said beam spot and projected on said 4-division optical detector to electrical signals, the surface of said 4-division optical detector being divided forming 4 separate detecting elements, a first pair of said 4 separate detecting elements being arranged correspondingly to one side of said track and a second pair of said 4 separate detecting elements being arranged correspondingly to another side of said track;

first multiplying means for multiplying respective outputs of said first pair of said 4 separate detecting elements with each other;

second multiplying means for multiplying respective outputs of said second pair of said 4 separate detecting elements with each other; and subtracting means for producing a difference value between respective outputs of said first and second multiplying means;

said displacing means displacing said beam spot in response to said difference value to perform tracking control of said beam spot on said series of pits laid along said track.

* * * * *